(12) United States Patent
McKeown et al.

(10) Patent No.: US 6,287,199 B1
(45) Date of Patent: Sep. 11, 2001

(54) INTERACTIVE, PREDICTIVE GAME CONTROL SYSTEM

(75) Inventors: Mark William McKeown, London (GB); Thomas Kanady, San Jose, CA (US); Jason Robert Malaure; David Robert Weston, both of Chinnor (GB)

(73) Assignee: Two Way TV Limited, London (GB)

( * ) Notice: Subject to any disclaimer, the term of this patent is extended or adjusted under 35 U.S.C. 154(b) by 0 days.

(21) Appl. No.: 09/064,118

(22) Filed: Apr. 21, 1998

(30) Foreign Application Priority Data

Apr. 22, 1997 (GB) .................................................. 9708061

(51) Int. Cl.[7] ..................................................... G06F 19/00
(52) U.S. Cl. .................................................. 463/40; 463/4
(58) Field of Search ................................... 463/40, 41, 42

(56) References Cited

U.S. PATENT DOCUMENTS

| | | | | |
|---|---|---|---|---|
| 4,540,174 | * | 9/1985 | Coppock | 273/138 R |
| 4,592,546 | * | 6/1986 | Fascenda et al. | 273/1 E |
| 5,073,931 | * | 12/1991 | Audebert et al. | 380/23 |
| 5,683,090 | * | 11/1997 | Zeile et al. | 273/269 |
| 5,759,101 | * | 6/1998 | Von Kohorn | 463/40 |
| 5,860,862 | * | 1/1999 | Junkin | 463/40 |
| 5,899,810 | * | 5/1999 | Smith | 463/42 |
| 5,971,854 | * | 10/1999 | Pearson et al. | 463/41 |

* cited by examiner

Primary Examiner—Valencia Martin-Wallace
Assistant Examiner—Julie Kasick
(74) Attorney, Agent, or Firm—Price and Gess

(57) ABSTRACT

An interactive, predictive game control system for use in conjunction with a live TV broadcast received by one or more remote players. The system comprises a central controller for generating game playing data for transmission with a TV broadcast to the remote player(s) and for receiving information from the remote player(s). An input device is connected to the central controller. A database is connected to the central controller for storing data relating to the content of the live broadcast and known in advance of the live broadcast. The central controller is responsive to signals from the input device:

a) prior to the live broadcast, to select data from the database for transmission to the remote user(s) in advance of and/or during the live broadcast, and b) during or after the live broadcast, to record the time of occurrence of one or more events relating to the live broadcast which are to be predicted by the remote player(s), as indicated by an operator to the central controller via the input device.

15 Claims, 17 Drawing Sheets

Fig. 11.

| Course details | Race list | Details Sent | Race 1 | Race 2 | Race 3 | | | | |
|---|---|---|---|---|---|---|---|---|---|
| | | | Game started | | Race 1 Start | | Final Scores | | |
| Number of races | 3 +/- | | | | | | SEND | | |
| Time | Course | | Race Name | | | | Dist. | Entries | Hcap |
| 3.10 | WINCANTON | | Badger Beer Handicap Chase | | | | 3m 1f | 9 | Yes |
| 3.45 | WINCANTON | | Tanglefoot Elite Hurdle | | | | 2m | 8 | No |
| 4.05 | DONCASTER | | Coalite Dragon Handicap | | | | 2m 1f | 17 | Yes |

Fig.14.

| Course details | Race list | Details Sent 1 | Race 2 | Race 3 | | Game started | Race 1 Start | Final Scores |

Horse
4 | COOME HILL

Age  Weight
7 | 11-7

Jockey
J FROST ▶

Draw
☐

Trainer
W Dennis ▶

Form
1/12-1 ▶

Colours
Dark blue, white cross belts. White cap, dark blue star

Breeding
b g Riot Helmet-Ballybrack

Owner
Mrs Jill Dennis

Form guide
Unbeaten in five points in this country. Has won 2 out of 3 in hunter classes. Gone up 6lbs

Form #
140

<<Previous<< | >>Next>> | Cancel | Done

Fig.15.

| | ASCOT | | Good to Soft | |
|---|---|---|---|---|
| | 2.30 | Willmott Dixon Cornwalls Stakes 5f | | 12 run |
| | 1 | EASYCALL | M TEBBUTT | 12 |
| | 2 | DEEP FINESSE | PAT EDDERY | 7 |
| | 3 | BLUE RIDGE | CM J KINANE | 3 |
| | 4 | CHECK THE BAND | C ROCHE | 1 |
| | 5 | GRAND LAD | R HILLS | 8 |
| | 6 | MELIKSAH | M FENTON | 9 |
| | 7 | OMAHA CITY | B DOYLE | 10 |
| | 8 | RUDI'S PET | DANE O'NEILL | 5 |
| | 9 | SUPERIOR PREMIUM | A CULHANE | 4 |

INTERACTIVE, PREDICTIVE GAME CONTROL SYSTEM

FIELD OF THE INVENTION

The invention relates to an interactive, predictive game control system for use in conjunction with a live TV broadcast.

DESCRIPTION OF THE PRIOR ART

In an interactive, predictive game played in conjunction with a live TV broadcast, remote players attempt to predict certain events which may or may not occur during the broadcast and will be awarded prizes, monetary or otherwise, if they are successful. Examples of interactive, predictive games include horse racing where the players can try to predict winners or place bets on particular horses to win or be placed in a race, and football matches where players may try to predict the final score or the time of occurrence of certain events such as the time of the first goal, first booking etc. Other examples are rugby, motor racing, tennis and cricket. An example of an interactive system is described in U.S. Pat. No. 4,592,546. This document describes in detail how the remote units are organised and controlled but provides very little information on the central location.

In order to enhance the enjoyment of such games, it is desirable to be able to present players with information relating to the game in advance of, and on occasion during, the playing of the game so that they can make intelligent predictions. For example, in the case of a horse race, it would be desirable to give the players information regarding the horses, the jockeys, the course and the odds while for a football game, players would like to have details of the teams, past form and current position in a league table. Much of this information, in particular information on odds and the like, will change in the run-up to the game and consequently there is a continuing need for instantaneous updates.

SUMMARY OF THE INVENTION

In accordance with one aspect of the present invention, an interactive, predictive game control system for use in conjunction with a live TV broadcast received by one or more remote players comprises a central controller for generating game playing data for transmission with a TV broadcast to the remote player(s) and for receiving information from the remote player(s); an input device connected to the central controller; and a database connected to the central controller for storing data relating to the content of the live broadcast and known in advance of the live broadcast, the central controller being responsive to signals from the input device:

a) prior to the live broadcast, to select data from the database for transmission to the remote user(s) in advance of and/or during the live broadcast, and b) during or after the live broadcast, to record the time of occurrence of one or more events relating to the live broadcast which are to be predicted by the remote player(s), as indicated by an operator to the central controller via the input device.

In accordance with a second aspect of the present invention, a method of controlling an interactive, predictive game in conjunction with a live TV broadcast received by one or more remote players comprises:

a) prior to a live broadcast, selecting data from a database which stores data relating to the content of the live broadcast and known in advance of the live broadcast, and transmitting the selected data with a TV broadcast to remote player(s) in advance of and/or during the live broadcast, and b) during or after the live broadcast, recording the time at which one or more events occur within the live broadcast and which are to be predicted by the remote player(s).

We have devised a control system and method which allows an operator to achieve as much preparation as possible prior to the commencement of a live TV broadcast. Typically, the database will store information relevant to future predictions. The operator is able to select data appropriate to the live TV broadcast from the database and arrange for this to be assembled as appropriate into a display format which can then be transmitted in association with a TV broadcast, either in advance of and/or during the live TV broadcast, to the remote player(s). This then allows the operator to concentrate on monitoring the live broadcast for the occurrence of events which are to be predicted by the remote player(s) without having to enter large amounts of data through the input device.

The time at which the event(s) occur during the live broadcast may be entered by the operator later, for example after the live broadcast has ended but preferably the operator indicates the time of occurrence immediately. The time of occurrence can then be recorded as the actual time at which an operator provides an indication or as the actual time when amended to take account of the operator's and system's response time.

In the preferred control system, therefore, the central controller computes the actual time of occurrence of an event by monitoring the time of a signal generated by the input device in response to operator activation, and modifies that time to take account of the operator's and system's response time.

Typically, an operator will undergo a test procedure in which his response time and the system latency is determined by the central controller and this response time and latency is then stored for later use in computing the actual time of occurrence of events in the live broadcast.

In order to communicate times between the control system and the remote player(s), it is necessary to encode those times into signals which are transmitted between the two locations. This is most conveniently achieved by a process known as "time stamping" in which data defining the times are attached to messages between the two. Time stamped signals supplied to the remote player(s) can be used in a variety of ways at the remote location. For example, the signal can be used as a lock-out command preventing further predictions being made by the remote player(s). It can also be used, of course, to enable the remote player(s) to determine whether or not he has made a successful prediction.

Typically, each remote player will be provided with a local control unit including a microprocessor which can respond to signals from the control system and to locally generated signals by the player to effect local control of the game. In some cases, players predictions are communicated back to the central controller for adjudication but in other systems the local unit is able to determine, following information received from the central controller, whether or not the associated player has won and can then communicate that information to the central controller only in the case of a winning player. This reduces the amount of time needed to communicate with the central controller and the number of remote units which have to communicate at the same time.

Typically, communication from the remote player(s) to the central controller will be via an existing communication network such as public switched telephone network and the like although a permanent connection is also possible.

In some cases, the action of updating the database can cause a time to be recorded by the central controller. This could be, for example, the case where fixed odds stored within the database are updated and the time of updating is then recorded by the central controller in response to signals from the database.

BRIEF DESCRIPTION OF THE DRAWINGS

An example of a control system and method according to the invention will now be described with reference to the accompanying drawings, in which:

FIGS. 11–14 illustrate screen displays presented to an operator during preparation for a live horse racing game referred to as PlayLive Racing; and, FIGS. 15–17 illustrate screen displays presented to a player during a PlayLive Racing game.

DETAILED DESCRIPTION OF THE EMBODIMENTS

Figure 1:
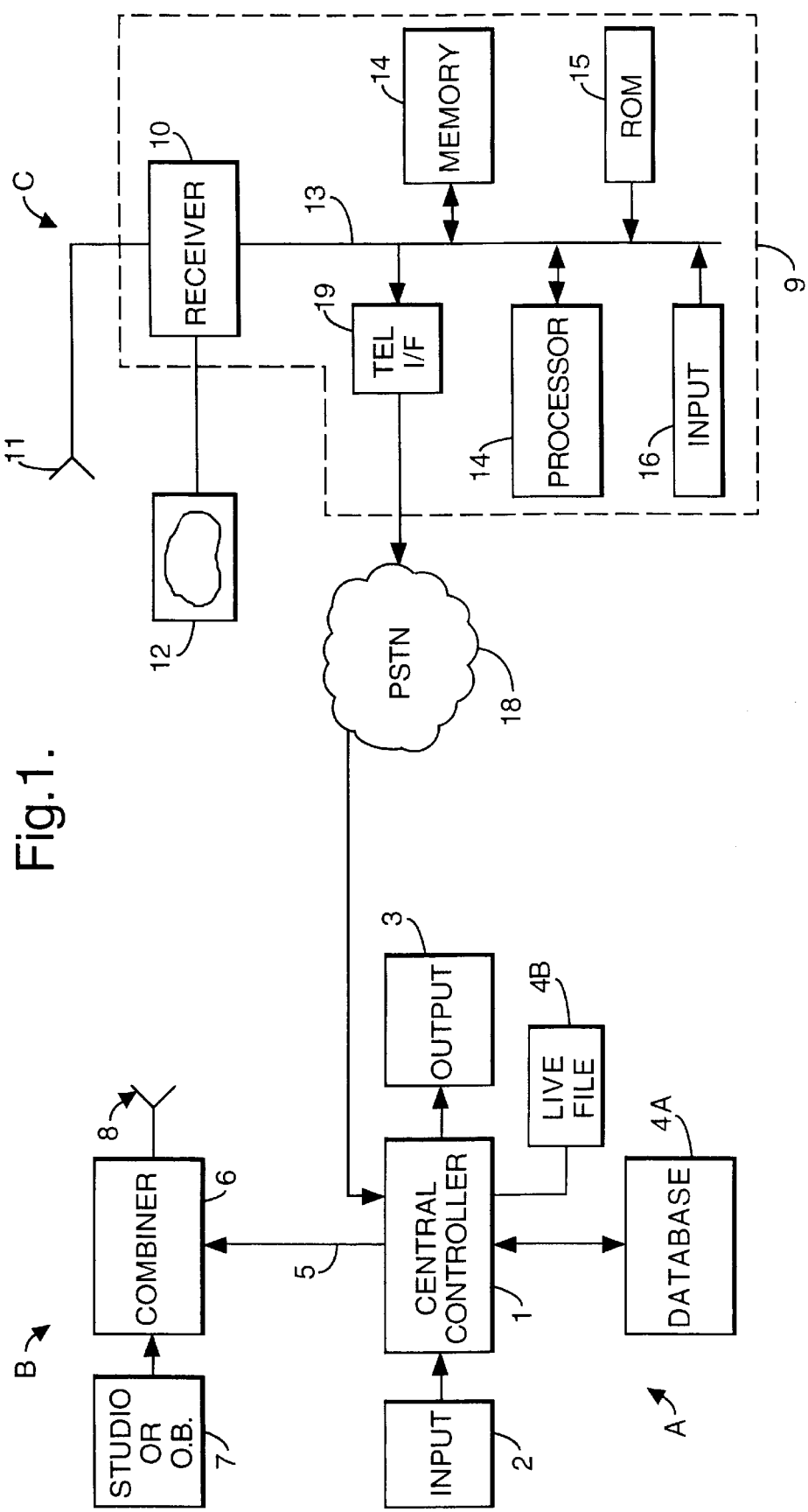
FIG. 1 is a schematic block diagram of the control system and an interactive broadcast network incorporating the control system.

The interactive broadcast network shown in FIG. 1 comprises a game control system A including a central controller 1 which will include a computer such as a PC operating a Windows based system, connected to an input device 2 such as a keyboard and/or mouse and the like and to an output device 3 which may include a monitor and/or printer. A database 4A stores data relating to service functions and remote users, which can be accessed and amended by the central controller 1, while a Live File store 4B is provided for storing data relating to the game being or to be broadcast. The central controller 1 generates data which can be converted to TV display signals and other control signals associated with various service functions, on a land line 5 connected to a combining unit 6 defining an insertion point of a TV broadcast system B. The combining unit 6 receives television broadcast signals from a studio 7 (or outside broadcast (OB) location, in the case of a live event), and combines these with the signals on the line 5 so that they are transmitted simultaneously by a transmitter 8 to remote users or players C. In other applications, the signals from the central controller 1 and the studio or OB 7 will be transmitted separately.

The signals applied to the combiner 6 may be transmitted to the remote units within a vertical banking interval (VBI) of the normal TV signal or on a separate radio FM-SCA channel or other data format such as a cable modem.

Each remote user C has a home or remote unit 9 having a television receiver 10 connected to an aerial 11 and a monitor 12. The home unit 9 includes an address/databus 13 connected to the receiver 10, the bus 13 being connected to a microprocessor 14, a memory 15, such as a ROM, storing programme instructions for the processor 14, one or more input devices 16 such as a keyboard or mouse, and a control memory (RAM) 17. Signals transmitted by the processor 14 can be communicated to the central controller 1 via a public switched telephone network 18 which is selectively accessed by a telephone interface unit 19 connected to the bus 13.

Alternative media such as cable or the internet can be used for the return signals (as for the signals transmitted to the remote unit C). In general the return signals will be transmitted over a different medium to the incoming signals.

The game control system A can be used to control a variety of games including interactive, predictive games and two examples of such interactive, predictive games will be described below. In the first example, play live football, the remote players are able to attempt to predict certain events prior to commencement of a live football match which is broadcast by the transmitter 8 and can also attempt to predict certain events during the live broadcast.

Figure 2:
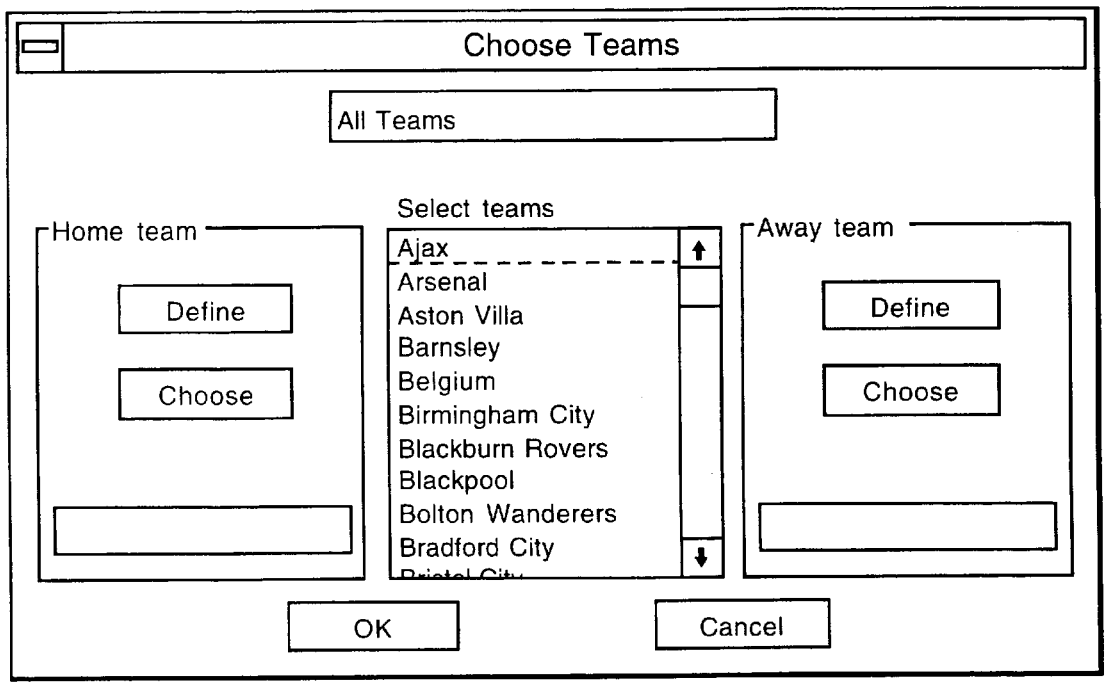
FIGS. 2–5 illustrate examples of screen displays presented to an operator during preparation for a live football game referred to as PlayLive Football.
Figure 3:
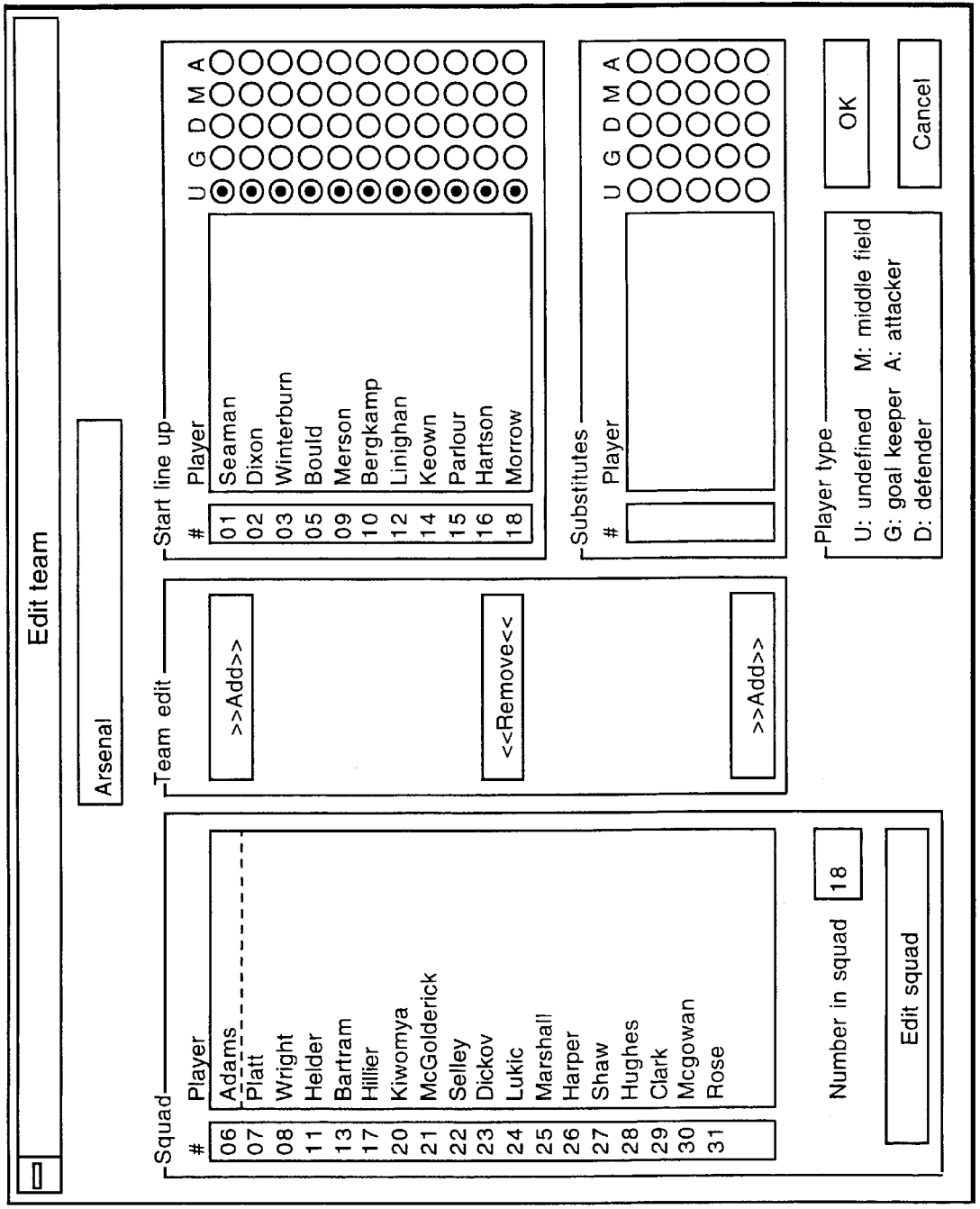

Initially, prior to commencement of the live broadcast, an operator uses the input device 2 to set up certain predetermined information relating to the live broadcast for transmission to the remote players. In this example, the operator is first presented with a screen as shown in FIG. 2 in which he can select a home team and an away team from a list of such teams which have been previously stored in the database 4A. Using the input device 2, such as a mouse, he can select the appropriate home and away teams and then click the OK button. This information is then stored in the Live File store 4B. The database 4A stores information relating to each team squad which will typically include more players than those actually selected to play the match. Shortly before commencement of the match, the actual team will be announced and this information will be conveyed to the operator. He then causes the central controller 1 to display all members of the squad of each team (FIG. 3) allowing the operator to indicate which members of the squad have been picked to play and at the same time, he can define the type of player, for example goalkeeper, attacker, midfield or defender. Once that information has been indicated, it is then stored in the Live File store 4B.

Also, before the game begins, the operator takes a calibration of his own reaction time and the system latency. This can be obtained during a test procedure in which the central controller 1 presents a particular display on a monitor of the output device 3 to which the operator must react as quickly as possible. The central controller 1 then determines the time between initiating the display and the time at which a response is sensed and this will be a latency value which is used to adjust future times of occurrence of events which are entered by the operator. This process can be repeated at intervals during the game either automatically or on operator request. This enables the latency to be updated to take account of variation in the operator's response times.

The operator also sets up the particular types of event which can be predicted during the live broadcast. In this example, these events include the time of the first goal, the time of the first booking etc. Examples of such events are indicated by the line of buttons at 50 in FIG. 4.

Figure 4:
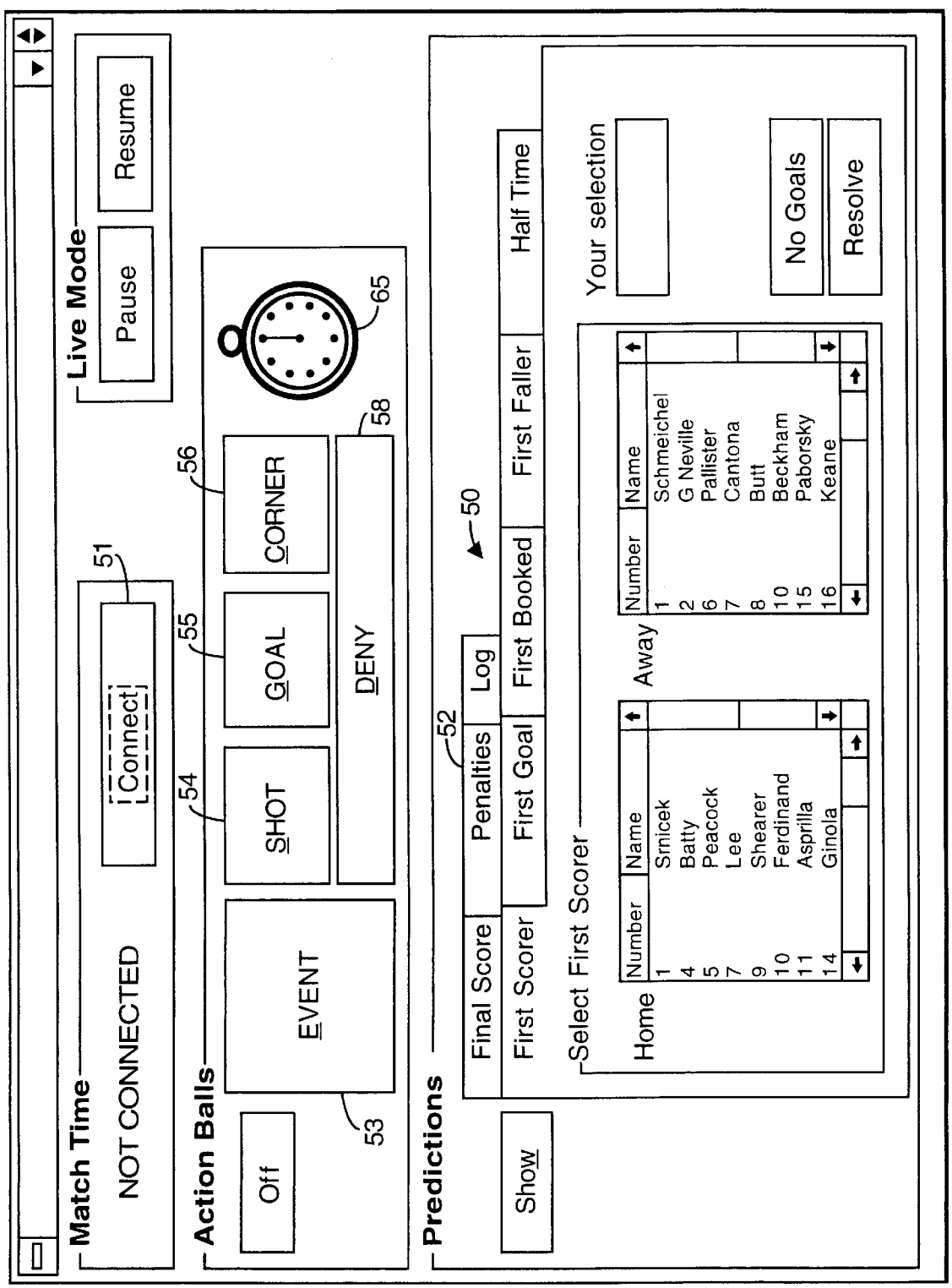

Once all the information for the live broadcast has been set up by the operator, a screen such as that shown in FIG. 4 is displayed which at this time is inactive since the interactive game has not commenced. It will be noted, however, that the operator has been able to set up a significant amount of information in advance of the live broadcast itself.

Figure 5:
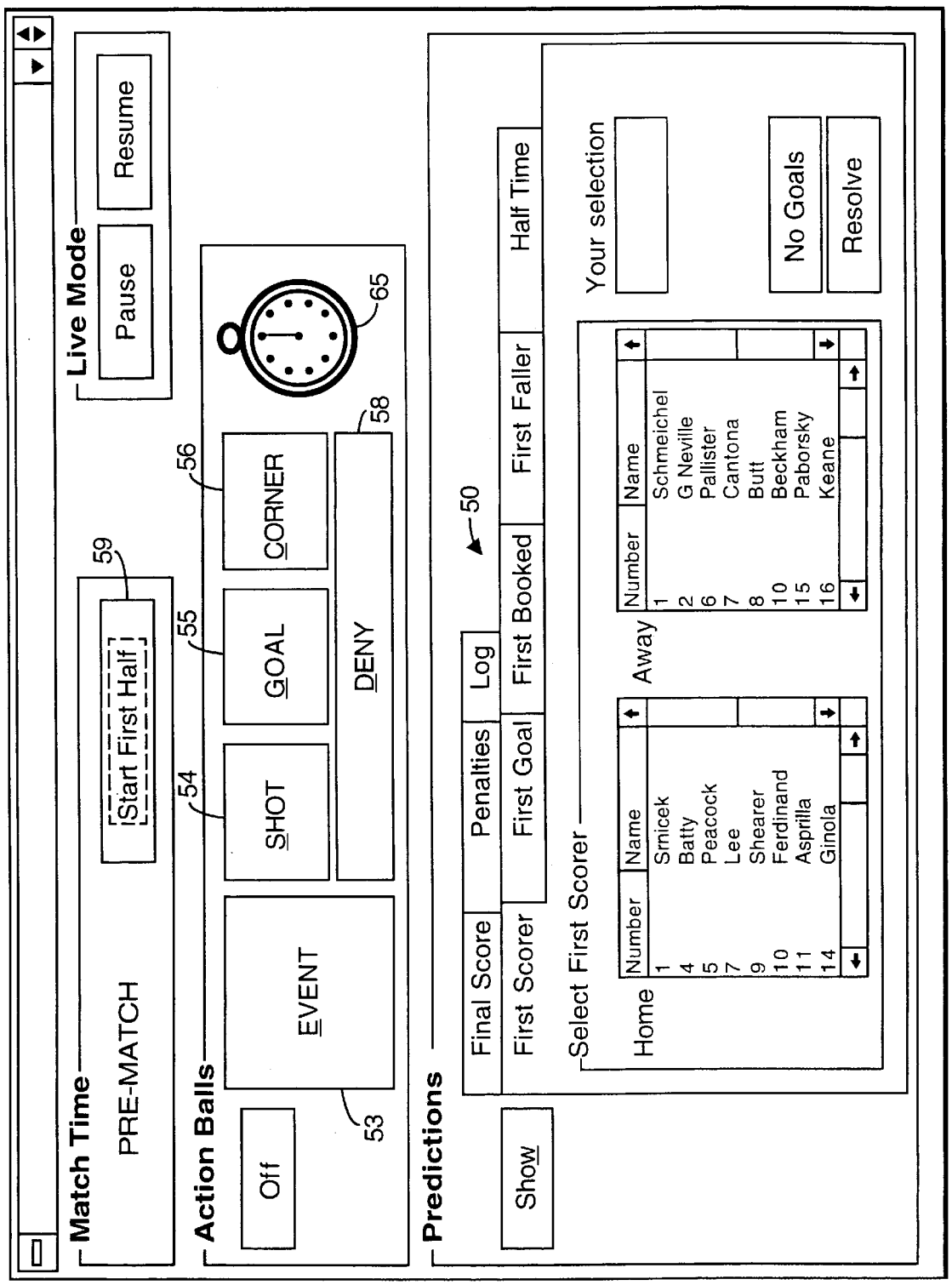

At the appropriate time, but before commencement of the football game, the operator will bring up the screen shown in FIG. 5 and by clicking the button 51, the predefined information will then be transmitted to the combiner 6 and broadcast to all the remote players C where it will be stored in each memory 17.

Figure 6:
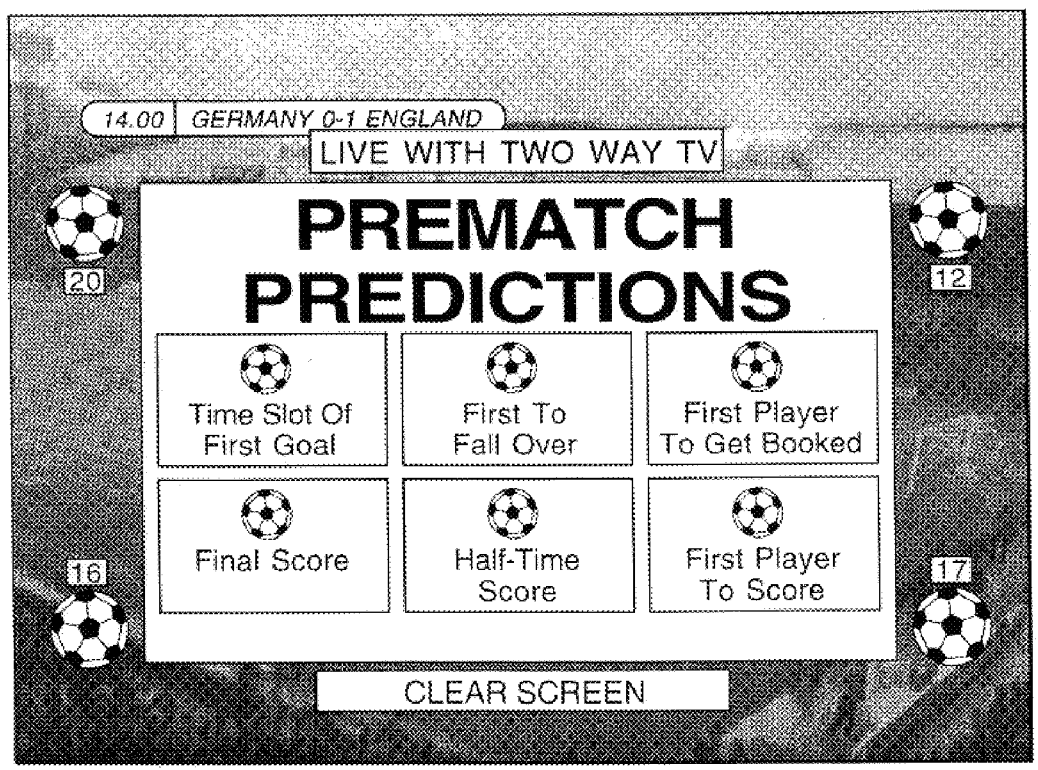
FIGS. 6 and 7 illustrate screen displays presented to a remote player of PlayLive Football.

If a remote player wishes to play the interactive game, he operates his input device 16 to indicate to the processor 14 that the game is to be initiated and the processor 14 will respond to the information supplied from the central controller 1 and stored in the memory 17 to display a screen similar to that shown in FIG. 6. This indicates to the player the type of prediction which he can attempt. A comparison of FIGS. 4 and 6 will show that six of the events selected by the operator for prediction set out in the line 50 are displayed on the display of FIG. 6.

Figure 7:
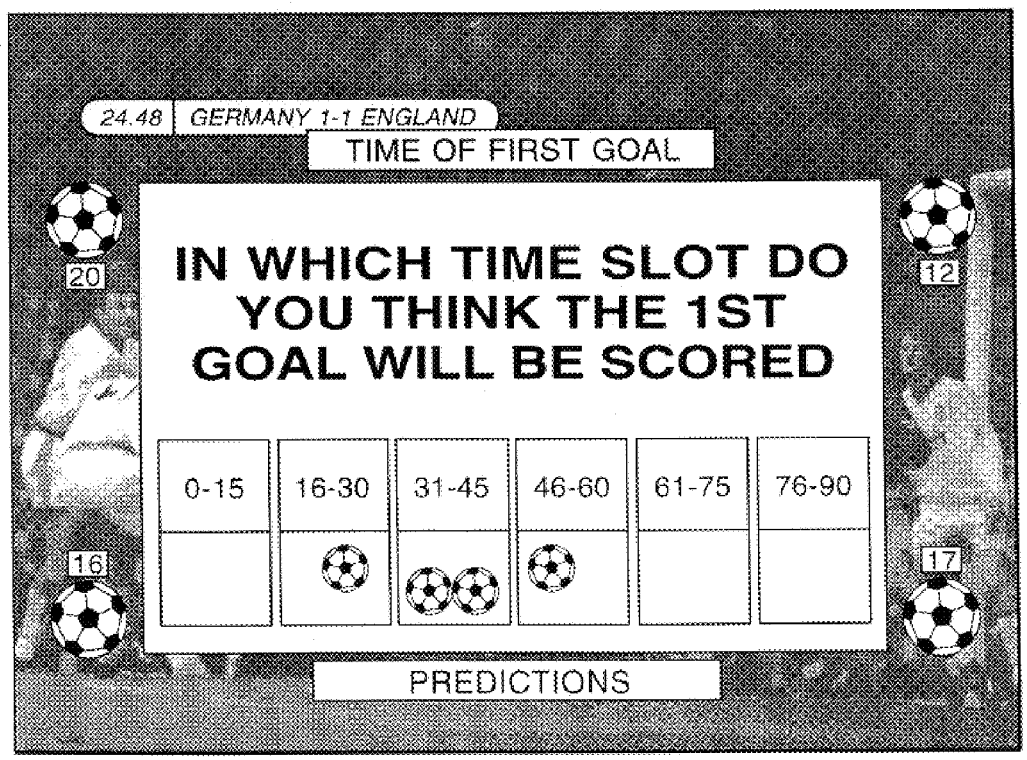

The remote player can then select one or more of the predictions. For example, if he selects, using the input device 16, the "Time Slot of First Goal", the screen shown in FIG. 7 will be displayed which defines six different 15 minute periods during the playing of a football game. The player can then indicate one of those periods using the input device 16, for example, the period 16–30 minutes, and this prediction is then stored in the memory 17. In a similar way, the player can predict any one or more of the other items set out in FIG. 6.

Figure 8:
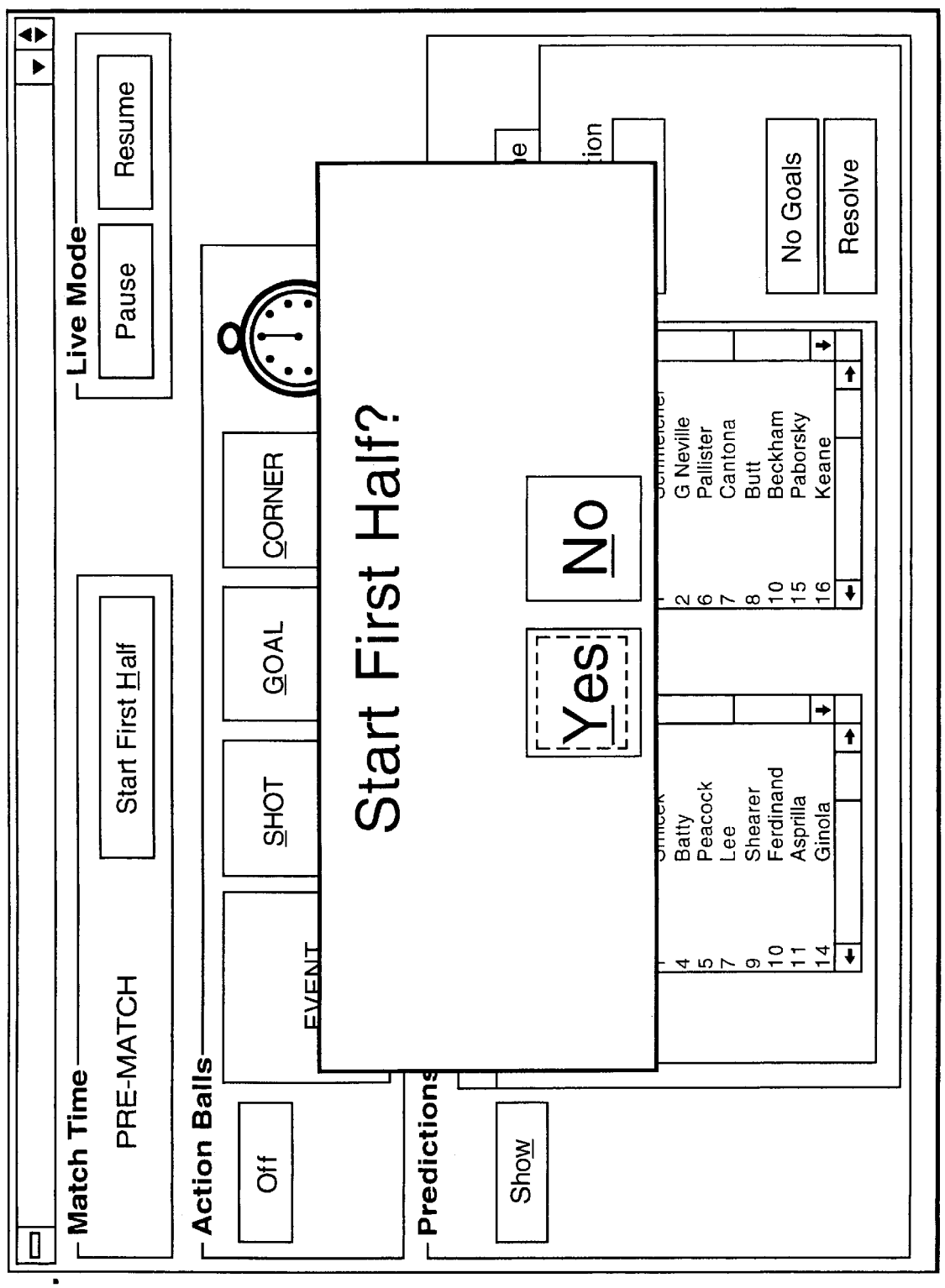
FIGS. 8 to 10 illustrate screens presented to an operator during a PlayLive Football game.
Figure 9:
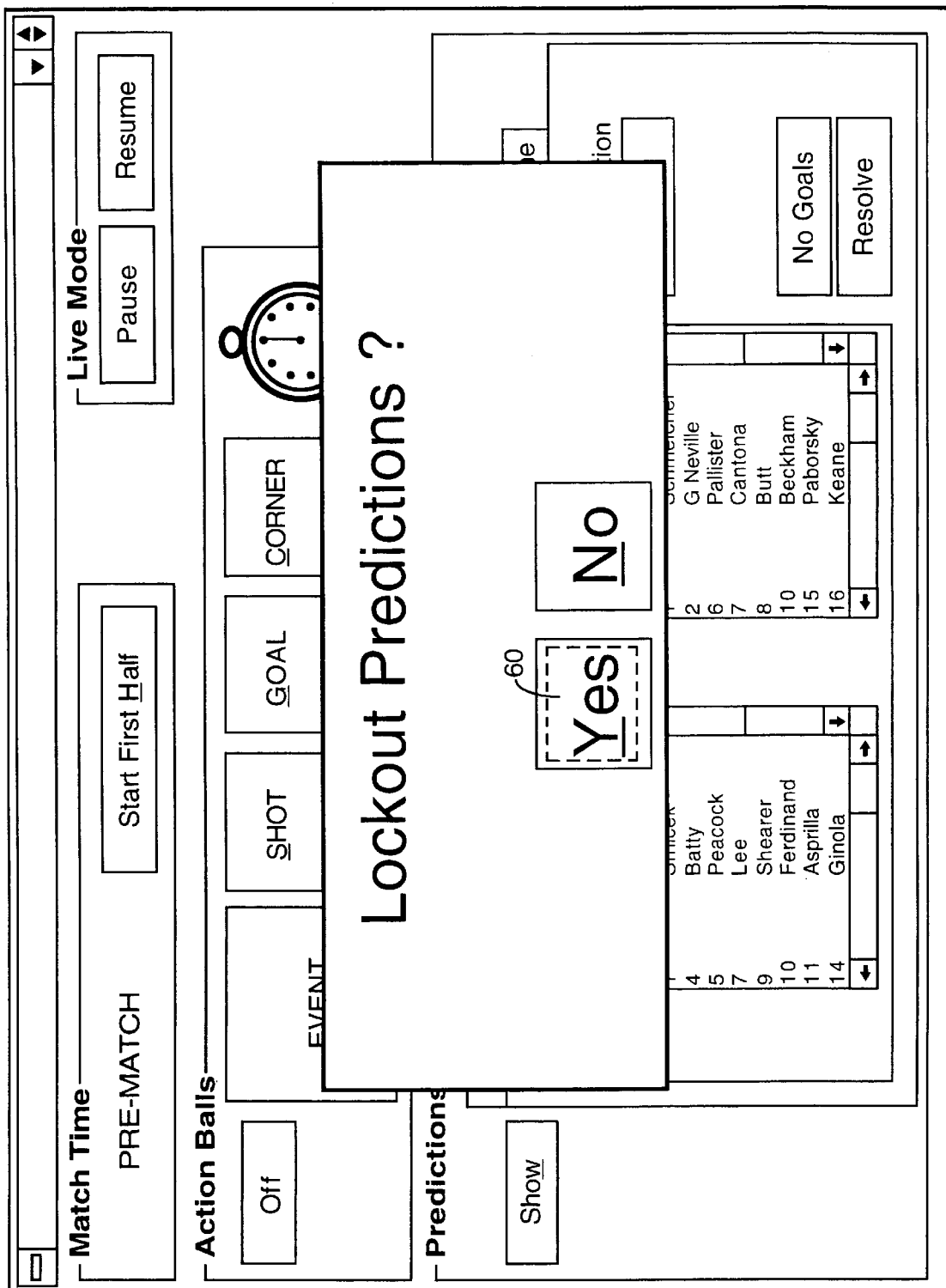

Immediately the game commences, the operator clicks on the "Start First Half" button 59 (FIG. 5) and this will cause the central controller 1 to display the screen of FIG. 8 asking the operator to confirm. Following confirmation, the screen of FIG. 9 is displayed allowing the operator to lock out further predictions at the start of the game. In response the central controller 1 will issue a lock-out signal which is broadcast to the remote units C and to which each processor 14 responds to prevent any further predictions from being entered. The lock-out signal will carry a time stamp which defines the instant at which the operator clicked on the button 60 but back stamped by an appropriate number of frames corresponding to the earlier determined calibration of the operator response time and system latency. Each microprocessor 14 responds to the received lock-out signal to lock-out any future predictions and also any previous predictions which occurred after the back adjusted time stamp.

In order to obtain accurate synchronisation between the central controller clock and each remote unit C, all parts of the interactive network work to a common universal system clock. Synchronisation is maintained by the central controller 1 repeatedly issuing synchronisation signals as part of the messages which are broadcast. Each microprocessor 14 monitors the time of arrival of a synchronisation signal and compares this with its own clock and if there is a discrepancy gradually adjusts its clock to agree with the synchronisation signal.

As the game develops, various events may or will occur. For example, when the first goal is scored, the operator clicks on the First Scorer button 61 to enable him to select the appropriate score and also clicks on the First Goal button 62 to indicate the time of the first goal. This information is then confirmed by the operator by clicking the Resolve button 63 and the information is then transmitted in the usual manner to the remote players.

The time of the first goal transmitted to the remote players will be the time at which the button 62 was pressed adjusted by the prestored latency. This is sent as a time stamp to the remote players.

Similarly, at half time, clicking the Half Time button 64 will allow the operator to enter the half time score which is then transmitted to the remote players where it can be compared with their predictions.

During and/or after a game, the respective microprocessors 14 compare the associated player's predictions with the actual events as time stamped and supplied from the central controller 1. If the local player was successful in his prediction then the microprocessor 14 will indicate this to the player and will also pass that information via the PSTN 18 to the central controller 1. This is particularly useful where players will be rewarded with a financial prize or token allowing them additional use of certain games which require payment. In other applications, however, where no financial or other prize is awarded, communication with the central controller 1 is not necessary.

Figure 10:
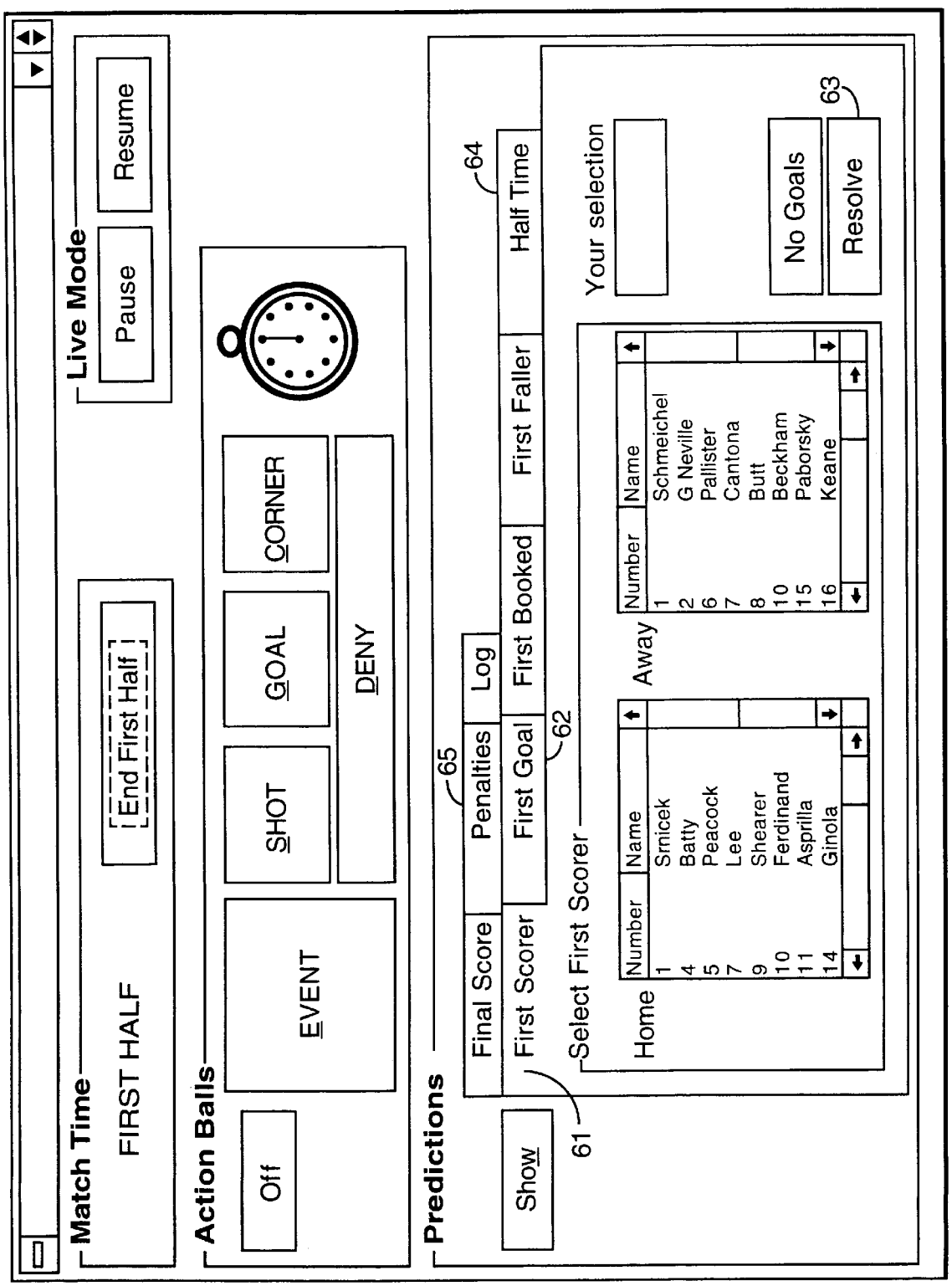

If there are any penalties at the end of the football match, the remote players are given the opportunity to predict whether a penalty kick will be scored, missed or saved, the operator controlling these predictions via the button 65 on the screen of FIG. 10.

The central controller 1 also allows a further game to be played by the remote players during the live broadcast of the football match. This is known as "Action Ball". During the football game, when the operator identifies a shot on target, a goal or a corner kick, he/she immediately registers this action by pressing the event button 53. A counter 65 begins countdown from 10 giving the operator 10 seconds to define the event as a shot on target, goal or corner kick by pressing one of the three buttons 54,55,56 or cancelling the indication by pressing the Deny button 58. Clicking one of the buttons 54–56 causes the central controller 1 to send an appropriate message to each of the remote players C in conjunction with a TV broadcast and each microprocessor 14 responds to receipt of that message by awarding points to those remote players who have correctly anticipated that one or the three events had occurred. Each remote player has 15 opportunities per half to anticipate that a shot on target, goal or corner kick will occur by operating his input device 16 which will initiate a 10 second period. The action by the remote player of pressing any blue button on his input device records a time stamp on the memory 17. The time that the event occurs as input by the operator, after suitable back stamping, will be broadcast as a time stamp to each remote player C. Each microprocessor 14 compares the time stamp supplied to it corresponding to the time at which the event button 53 was clicked and if the remote player pressed his blue button in less than ten seconds from the time stamp received by the microprocessor 14 then the player will have been successful and receive points.

In the second example, the PlayLive Racing game will be described. In this example, the central controller 1 will receive details about available races including declared riders and runners and this information will be stored in the database 4A and the operator will decide which races are to be included in the game. The database 4A will include details of all available races and in this example, the operator selects three using the screen shown in FIG. 11 and the input device 2, the selected information being stored in the Live File store 4B.

Figure 12:
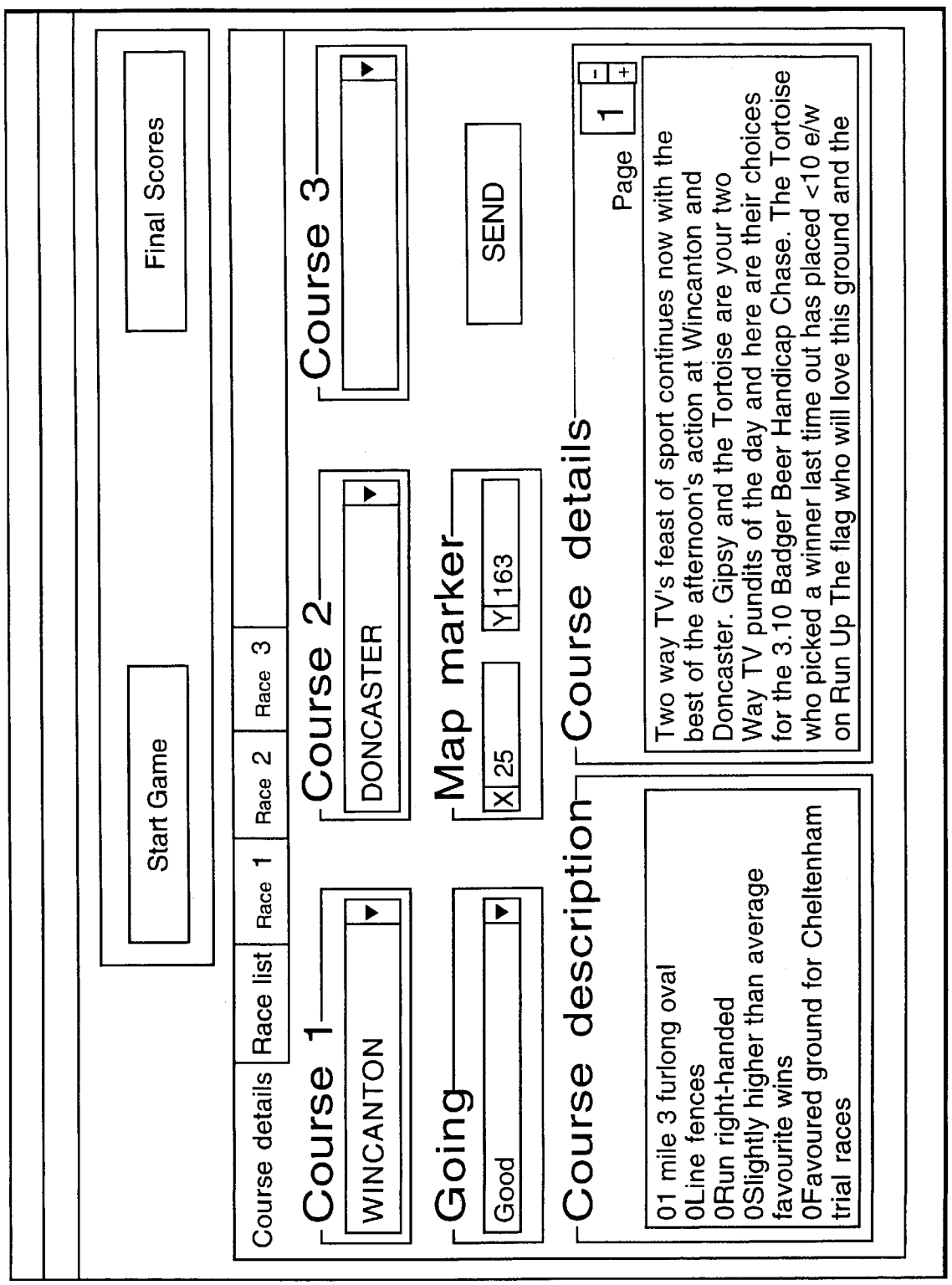

The operator then selects each race in turn and, for the first race, the screen shown in FIG. 12 is displayed to the operator. This will display certain fixed information already provided in the Live File store 4B such as the going of the course but allows the operator to add further information in the Course Details box as may be appropriate on the day.

Figure 13:
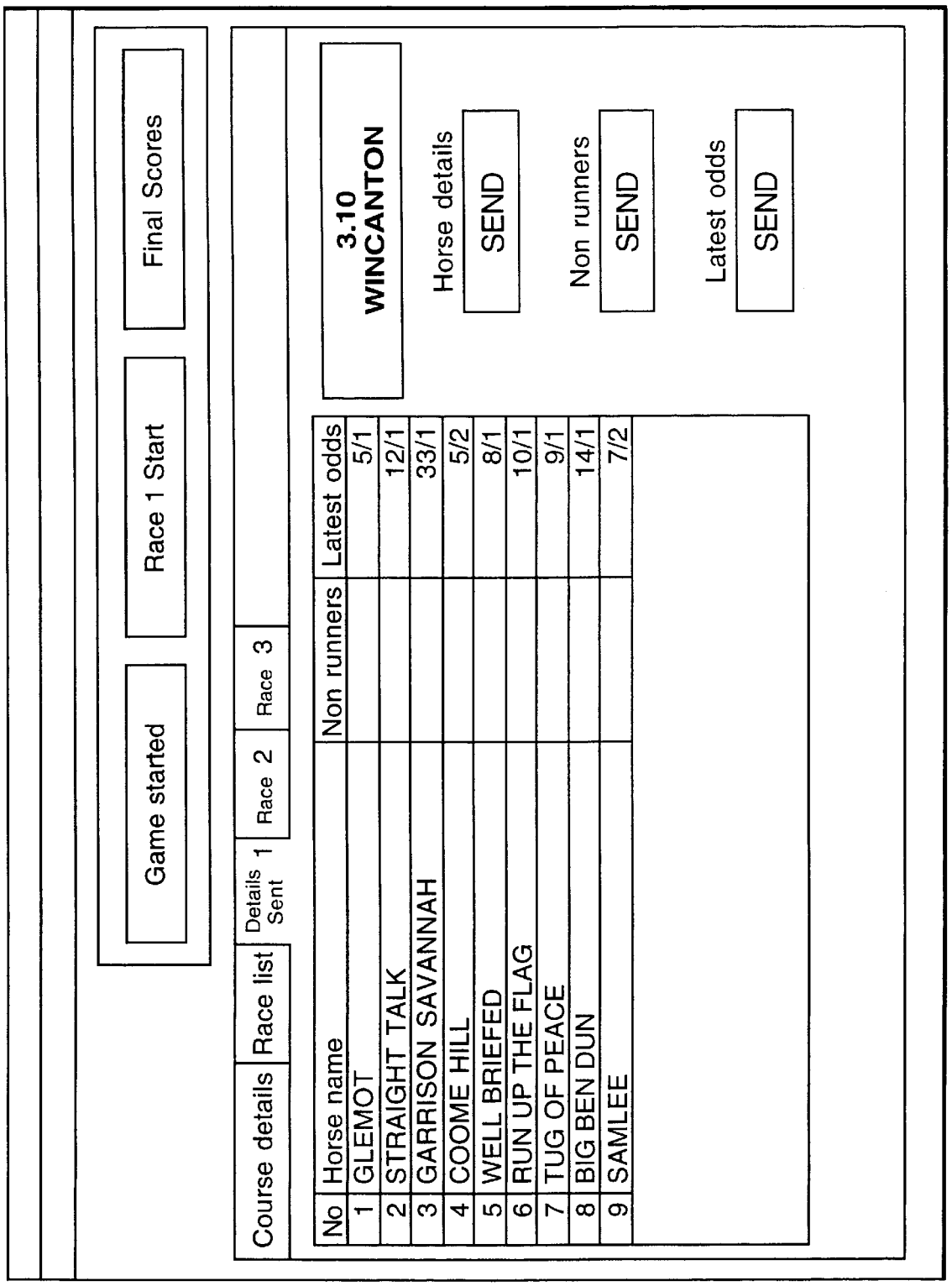

For each race, the operator then displays the screen shown in FIG. 13 allowing him to select the names of all runners and non-runners as this information is received. Alternatively, this can be carried out automatically via the database 4A as that portion is updated.

For each horse, the database 4A holds information relating to the horse and the operator can display this and modify it as necessary as shown in the screen shown in FIG. 14.

Once the operator has set up this predefined information in the Line File 4B, he will cause it to be made available to the remote units by broadcasting the information in the usual way. Each remote unit will receive the information and the microprocessor 14 will store that information in the control memory 17.

The odds for each horse can be manually entered by the operator as they change or this could be carried out upon loading the odds into the store 4B. In either event, on a change of odds, this information will be broadcast to the remote units together with a time stamp defining the time of the change. Again, this information can then be displayed by the remote user.

Finally, in preparation for the horse race, the operator will take a calibration of his own reaction time and the system latency as described above in connection with the PlayLive Football application. This calibration is then used to compensate input times by back stamping by the appropriate number of frames per second by which the action is delayed. Updates can also be obtained as before.

Once the operator has made his preparations, the information is transmitted to each remote player and stored in the memories 17. Each remote player can display the details of races, horses, odds and the like as necessary. For example, as shown in FIG. 15, the remote player can display a list of horses and jockeys for a particular race.

Figure 17:
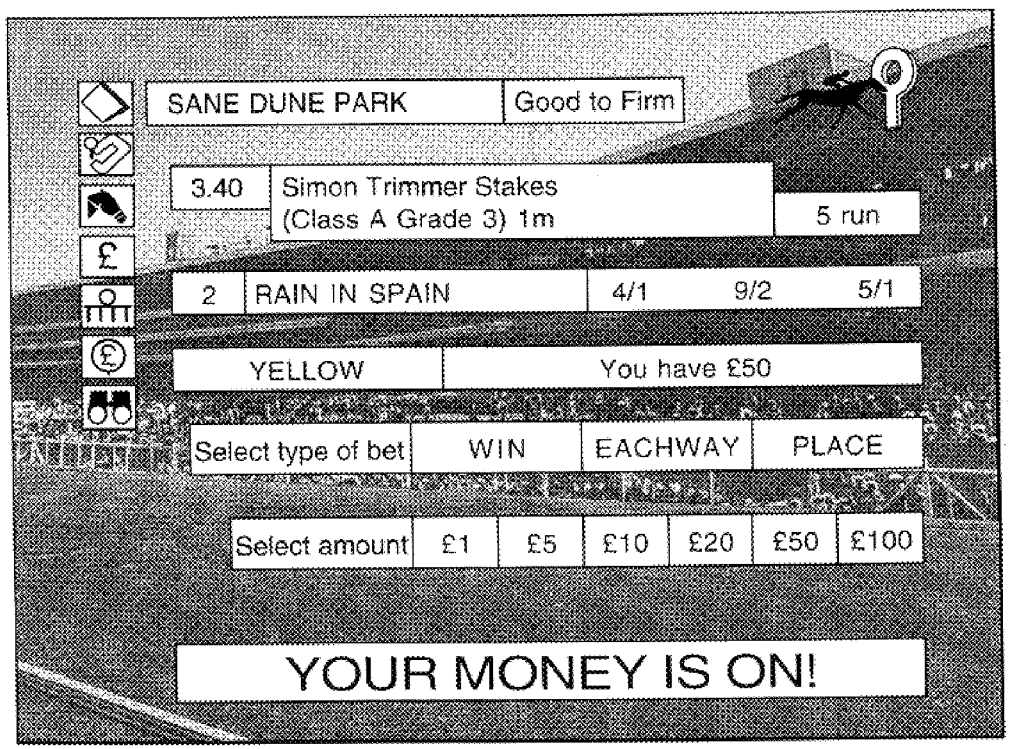

Just prior to the start of a race, the remote players are given the opportunity to predict the outcome of that race using one of the variety of bets on offer (i.e. win, place, each way). The remote player can choose to place a bet via an appropriate screen (FIG. 17) and once he has selected a bet and confirmed the amount of money he wishes to wager, he will receive confirmation that the bet has been accepted and these details will be stored by the microprocessor 14 in the memory 17.

Figure 16:
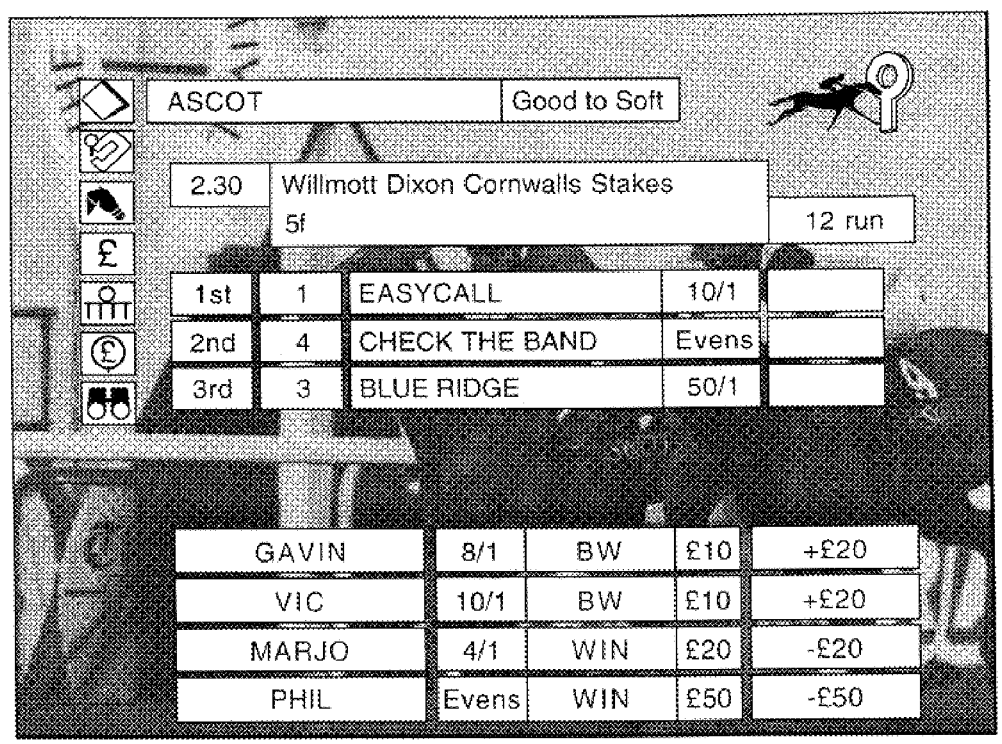

As soon as the race begins, the operator will indicate this via the input device 2 and an appropriately back stamped time stamp signal will be broadcast causing each microprocessor 14 to lock out all future predictions and to cancel any predictions made after the time defined by the back stamped time stamp. Once the race is finished, the operator sends out the results in two stages, first as unconfirmed results and then as confirmed results once these have been confirmed by the appropriate race authority. Each remote unit responds to the result information to determine whether the local player or players is successful and to determine the winning amount and displays this as appropriate, for example as shown in FIG. 16. In this case, there are four local players.

We claim:

1. An interactive, predictive game control system comprising:

a central controller for generating game playing data for transmission with a live TV broadcast to remote player(s) and for receiving information from the remote player(s);

an input device connected to said central controller; and a database connected to said central controller for storing data relating to the content of the live TV broadcast in connection with which prediction of an event during the live TV broadcast is to occur, the broadcast to be received by one or more remote players, the data being known in advance of the live TV broadcast, said central controller being responsive to signals from said input device:

(a) prior to the live TV broadcast in connection with which prediction of an event is to occur, to select data from said database for transmission to the remote players in advance of the live TV broadcast, and (b) during the live broadcast, to record a time of occurrence of one or more events relating to the live TV broadcast which are to be predicted by the remote player(s), as indicated by an operator to said central controller via said input device.

2. A system according to claim 1, wherein said central controller computes the time of occurrence of an event by monitoring the time a signal is generated by said input device in response to operator activation, and modifies that time to take account of the operator's and system's response time.

3. A system according to claim 1, wherein said database is updated by the time of occurrence of one or more events as determined by said central controller.

4. The system of claim 1 wherein the controller records the time of occurrence of one or more events after the live broadcast is over.

5. The system of claim 1 wherein the transmission to the remote player(s) also occurs during the live broadcast.

6. The system of claim 1 wherein said data is adapted for use in making said prediction.

7. A method of controlling an interactive, predictive game in conjunction with a live TV broadcast received by one or more remote players, the method comprising (a) prior to a live broadcast in connection with which prediction of an event is to occur, selecting data from a database which stores data relating to the content of the live broadcast and known in advance of the live broadcast, and transmitting the selected data with a TV broadcast to the one or more remote player(s) in advance of the live broadcast, and (b) during the live broadcast, recording the time at which one or more events occur within the live broadcast and which are to be predicted by the remote player(s).

8. The method of claim 7 wherein said recording occurs after the live broadcast is over.

9. The method of claim 7 wherein the transmission to the remote player(s) also occurs during the live broadcast.

10. The system of claim 7 wherein said data is adapted for use in making said prediction.

11. An interactive, predictive game control system comprising:

a central controller for generating game playing data for transmission with a TV broadcast to remote player(s) and for receiving information from the remote player(s);

an input device connected to said central controller; and a database connected to said central controller for storing data relating to the content of a live TV broadcast in connection with which prediction of an event during said live TV broadcast is to occur, the broadcast to be received by one or more remote players, the data being known in advance of the live broadcast, said central controller being responsive to signals from said input device:

(a) prior to the live broadcast in connection with which prediction of an event is to occur, to select data from said database for transmission to the remote player(s) during the live broadcast, and (b) after the live broadcast has begun, to record a time of occurrence of one or more events relating to the live broadcast which are to be predicted by the remote player(s), as indicated by an operator to said central controller via said input device.

12. The system of claim 11 wherein said data is adapted for use in making said prediction.

13. A method of controlling an interactive, predictive game in conjunction with a live TV broadcast received by one or more remote players, the method comprising:

(a) prior to a live broadcast, selecting data from a database which stores data relating to content of the live broadcast and known in advance of the live broadcast, and transmitting the selected data with a TV broadcast to remote player(s) during the live broadcast, and (b) after the live broadcast has begun, recording the time at which one or more events occur within the live broadcast and which are to be predicted by the remote player(s).

14. The system of claim 13 wherein said data is adapted for use in making said prediction.

15. An interactive broadcast network comprising an interactive, predictive game control system according to claim 1; and a number of remote units for receiving signals, transmitted in association with a TV broadcast, from the central controller, each remote unit including a microprocessor responsive to signals received from said central controller and connected to an input device for use by a remote player.

* * * * *